Inventor
James P. M<sup>c</sup>Cready,
By Clarence A. O'Brien
Attorney

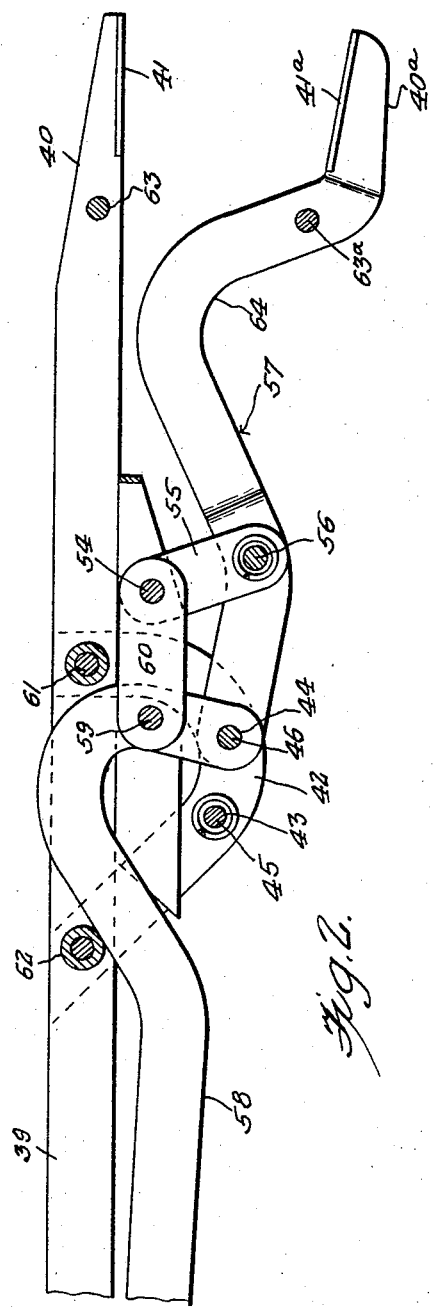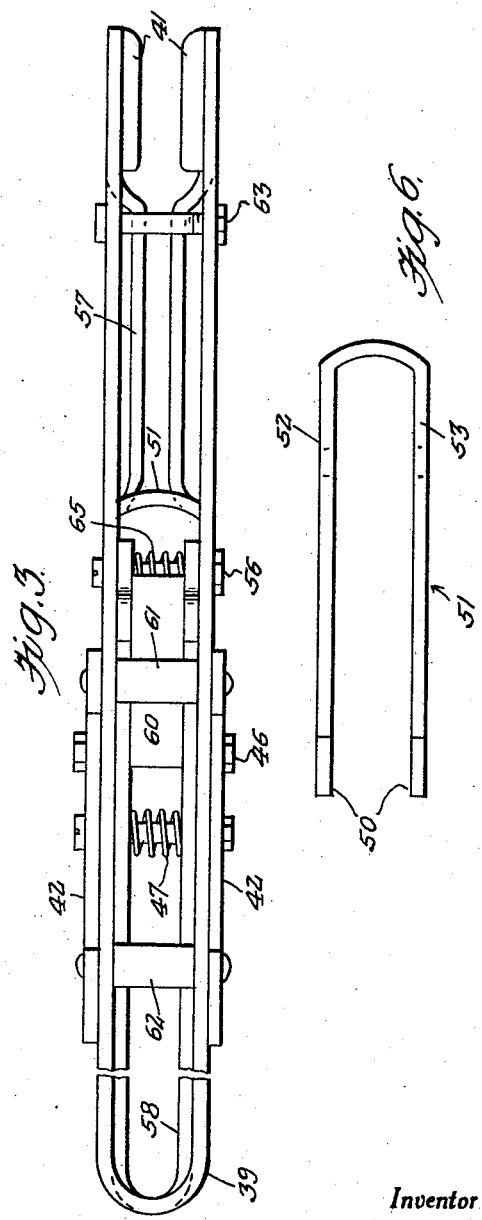

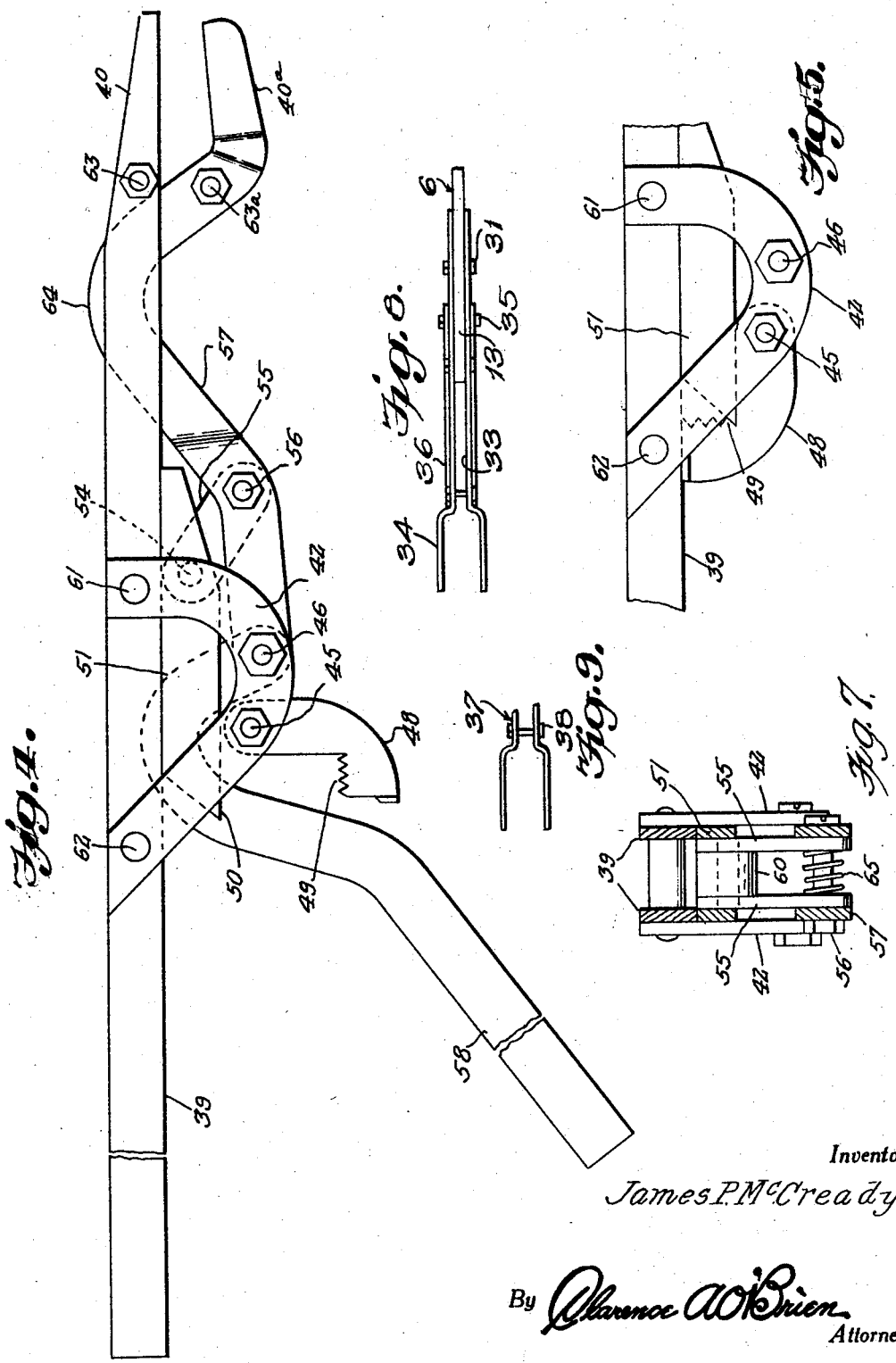

Patented Jan. 24, 1933

1,895,198

UNITED STATES PATENT OFFICE

JAMES P. McCREADY, OF BERLIN, NEW HAMPSHIRE

VALVE SPRING LIFTER

Application filed January 31, 1931. Serial No. 512,696.

This invention relates generally to an improvement in valve spring tools, and particularly to tools used for lifting the valve springs of internal combustion engine valve mechanisms during certain repair and replacement operations thereof well known in the art, whereby to facilitate working upon different types of internal combustion engines such as the types employing overhead valves, and those of the multiple cylinder type such as the V type, and various other types having constructions on account of which various degrees of difficulty are experienced in reaching and operating upon said valve springs.

It is an object of this invention to provide a practical, convenient and serviceable device which is highly adjustable to facilitate the operation of lifting and holding the valve springs of the different types of internal combustion engines, whereby the labor and assistance of more than one mechanic is rendered unnecessary in the operations of lifting and replacing the valve springs.

This and other objects of the invention, its nature, and its composition and arrangement and combination of parts will be readily understood by anyone acquainted with the art to which this invention relates upon consulting the following descriptions of the drawings, in which:

Figure 2 represents a form of my valve lifter which may be used separately from the adjustable frame illustrated in Figure 1.

Figure 3 is a view from the left of Figure 2.

Figure 4 is a view similar to Figure 2 except that Figure 4 shows the valve lifter in contracted position while Figure 2 shows the same in expanded position.

Figure 5 is a fragmentary view of a portion of the valve lifter showing the pawl in locked position in engagement with a slide thereof.

Figure 6 is a top plan view of the said slide.

Figure 7 is a horizontal sectional view through Figure 4 showing additionally the arrangement of the parts thereof.

Figure 8 is a plan view of the free end portion of the swingable member shown in Figure 1, and, Figure 9 is a top plan view of the top of the frame shown in Figure 1, showing the relation thereto of the rigid member and the swingable member.

Figure 1:
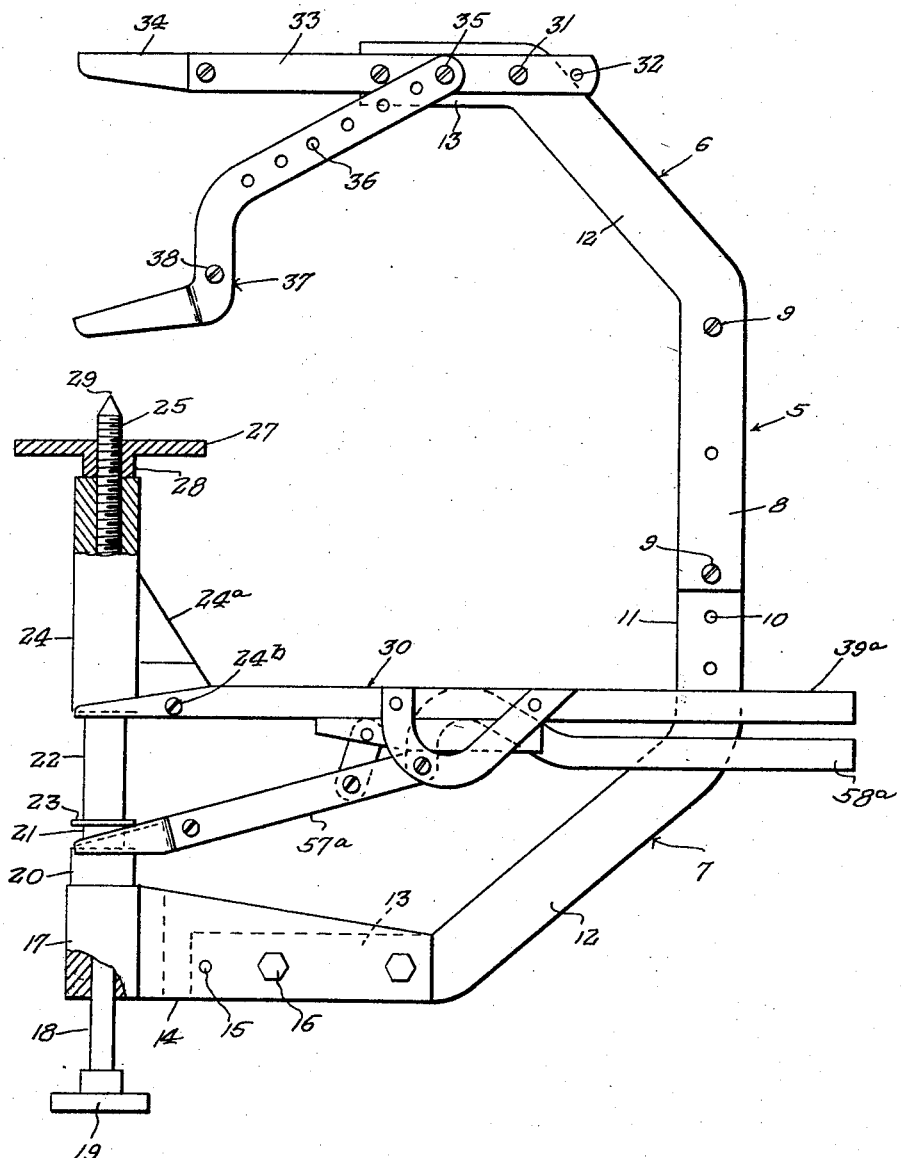
Figure 1 is a side elevational view of one form of the invention adapted to reach conveniently certain types of valve springs not ordinarily accessible, and to retain the same in the desired adjusted position.

Referring in detail to the drawings, the form of the invention illustrated in Figure 1 is characterized by an adjustable frame 5 which consists broadly of two flat bars 6 and 7. A straight portion 8 of the bar 6 is provided with bolts 9 which engage in a plurality of bolt holes 10 in a straight portion 11 of the bar 7, so that the bars 6 and 7 are connected in overlapping relation and can be adjusted with respect to each other longitudinally.

The bars 6 and 7 have inwardly directed angularly disposed portions 12 which terminate in an angular portion 13 which assumes a right angular relationship to the portions 8 and 11. It will appear from the drawings that the portion 12 of the bar 7 is slightly longer than the corresponding part of the bar 6 whereby the portion 13 of the bar 7 extends farther to the left of the drawing than the corresponding part 13 of the bar 6.

It is also to be noted that the part 13 of the bar 7 is longer than the corresponding part of the bar 6. Mounted in prolongation of the portion 13 of the bar 7 is a block 14 having a bifurcation to receive the portion 13, the furcations of which are transversely bored at 15 to receive bolts 16 which pass also through a plurality of holes 16a in the portion 13.

By reason of the provision of the bolt-holes 15 and 16a, the block 14 may be adjusted longitudinally with respect to the portion 13. The block 14 has on one end an expanded cylindrical portion 17 which is vertically bored to slidably accommodate a spindle 18 which has a hand wheel 19 on its upper end as shown in the drawing.

The lower portion of the cylindrical enlargement 17 is slightly reduced at 20 and below the reduced portion it is grooved as at 100

21 for a purpose to be explained. Below the flange 23 of the groove 21 is a further reduced portion 22 of the same diameter as the floor of the groove 21. The reduced portion 22 is in the form of a tube also slidably receiving the spindle 18. The sleeve 22 is slidably received within the cylinder 24 which is hollow and has a closed screw-threaded end portion at its inner end screw-threadedly receiving the screw-threaded end 25 of the spindle 18.

A circular plate 27 having a cylindrical shoulder 28 is also screw-threadedly mounted upon the screw-threaded portion of the spindle 18. The plate 27 is provided to engage the top of a valve in tightly adjusted manner, so that when pressure is applied in contracting the valve spring, slipping or tipping action is prevented and a steady, axially aligned pressure is assured on the valve. As a result of the structure just described, the spindle assembly may be slidably moved axially in either direction through the cylindrical enlargement 17. A fine adjustment of the spindle and flat head 27 may be secured by turning the handwheel 19 so as to rotate the spindle, which, being screw-threaded in the sleeve or cylinder 24, will move vertically as desired.

Under ordinary circumstances, a valve lifter structure generally designated 30 is mounted to co-operate with the groove 21 of the stationary cylindrical enlargement 17 and another element of the valve lifter seats under the cylinder 24, whereby upon the expanding or contracting action of the valve lifter 30, the cylinder 24 will be pushed upwardly or allowed to descend downwardly, through the telescopic relationship of the sleeve 22 and the sleeve 24 and the slidable relation of the spindle in the block 17.

The numeral 24a designates a web or brace which extends downwardly at an angle from the inward side of the cylinder 24 which structure provides for rigidly mounting one of the legs of the valve lifter in rigid relation to the cylinder 24, the bolt or screw means for said rigid attachment appearing at 24b.

The portion 13 of the bar 6 carries a longitudinally adjustable pair of springs bars 33. The portion 13 and the bars 33 have longitudinal series of bolt holes which may be selectively registered. Bolts 31 are provided to be passed through selected registered bolt holes for securing the spring bars in the described relationship with the portion 13. The spring bars 33 have tapered tip portions 34 for engaging a motor block or directly under the valve springs when operating upon valves.

Swingably mounted, and capable of various adjustments with respect to its point of attachment at 35 or by means of the bolts 31 passing through the portion 13, and the bars 33, and having a plurality of longitudinally spaced bolt holes 36, is longitudinally and swingably adjustable retractible spring-engaging structure generally designated 37 of the general contour in side elevation of a handled shovel. This element 37 may be used optionally instead of the element 33 and may be removed when the element 33 is being used. The element 37 is specially adapted for operating upon valves in engines having overhanging side portions adjacent the valve tappet mechanism. When operating upon this type of engine structure the element 33 may be removed.

The structure 37 is composed of a pair of bars pivoted by an attaching bolt as at 35 or by one of the bolts 31 as indicated, the bars being secured in spaced relation by another bolt 38 which acts also to clamp the bars into engagement with the spring bars 33 and the portion 13, so as to remain and be retained in the desired position. It will be observed that by swinging the element 37 into the position shown in Figure 1 that it is available for engaging under the valve spring in a different position from that obtainable by the use of the element 33, 34.

When it is not desired to use the element 37 it may be swung out of the way in such position that it will be instantly available for use if required.

Illustrated in the remaining figures of the drawings is the essential construction of the valve lifter and description thereof as illustrated in said figures will suffice to describe the form of the valve lifter 30 illustrated in Figure 1.

The main difference between the forms of the valve lifter illustrated in Figures 2 to 7 inclusive and that shown at 30 in Figure 1 is a difference in contour and curvature of the movable element of the valve lifter. The valve lifter comprises a U-shaped bar 39 made of flat spring material, the tips of whose legs are vertically tapered at at 40 and have inwardly bent portions 41. Attached by its legs at an intermediate point of each bar 40 is a substantially J-shaped support 42.

The pair of supports 42 is transversely bored at 43 and 44 to receive bolts 45 and 46 thereacross. Between the supports 42 and on the bolt 45 and tensioned by means of a spring 47, is a pawl in the form indicated at 48 of general L-shaped form having a rack 49 on the inward face of the foot of the L. The pawl is pivoted on the bolt 45 at one side thereof, and is free to swing to engage one angular end 50 of a U-shaped slide 51.

One edge of the legs of the U-shaped slide is downwardly slanted as at 52 in a direction toward the bight of the slide. The slide 51 slides between the supports 42 and upon the upper edge of the legs of the U-shaped bar 39. The forward part of the slide 51 receives a bolt 54 which pivotally connects to said slide a pair of short links 55 at whose upper end there is transversely carried a bolt 56 which also passes through the legs of a U-shaped swingable valve spring engaging member generally designated 57.

The inner end of the swingable member 57 is pivoted upon the bolt already designated 46. An operating lever 58 of general U-shaped form having a side elevation of a hook, has the extremity of the hook carried between the legs of the swingable member 57 and pivoted on the bolt 46, so that the hooked portion extends downwardly between the legs of the stationary U-shaped bar 39.

Inwardly of the terminus of the hooked portion of the operating lever 58 and inwardly of its pivotal connection with the bolt it carries another transverse bolt 59 which pivotally connects the one end of a pair of links 60 which is also mounted upon the bolt 54. The numerals 61 and 62 designate the transverse bolts through the legs of the U-shaped stationary bar 39 by which the J-shaped supports are assembled thereon.

It will be evident from the described linked connections that upon the swinging movement of the operating lever 58, the valve spring engaging member 57 will be swung about the common pivot bolt 46, so that it is caused to assume the position, either of Figure 2 or of Figure 4, and intermediate positions therebetween, so as to swing the outward end of the spring engaging member toward or away from the engine block engaging member 39.

It is provided that the opening between the inturned portions 41 of the block engaging bars 39 may be adjusted by means of a bolt 63 which is placed transversely through the bars near the outer ends thereof. The valve spring engaging member 57 has the general form in side elevation of a gooseneck as illustrated in Figure 2 and Figure 4, and the bars of the curvate portion thereof designated 64 are spaced so that they may pass between the legs of the stationary bars 39 as illustrated in Figures 3 and 4. This permits the close positioning of the ends of the stationary member 39 and the swingable member 57.

The valve spring engaging member 57 has its outer end portions tapered as at 40a where it is also provided with inwardly projecting flanges 41a and inwardly thereof with a transverse bolt 63a for adjusting the spacing of the bars thereof in the same manner as provided for the bars 39. The bolt 56 carries between the links 75 a coiled expanding spring 65 which acts to tension the parts mounted on the bolt 56.

In operating the device of the invention, the outer end of the member 39 is placed on the engine block adjacent the tappet structure and the outer end of the member 57 under the valve spring. Thus when the flanges or inwardly projecting portions 41a and 41 are placed in respective association with the washer of the valve spring, and the portion of the block associated with the tappet or valve stem, the brining of the operating lever 58 from the position shown in Figure 4 toward the position illustrated in Figure 2 will result in separating the outer end of the member 57 from the member 39, resulting in the compression of the valve spring so that the pin therein may be easily extracted from the valve stem and its assembly. In order to maintain the valve spring compressing relationship of the members 39 and 57, there is provided a pawl 48 having teeth 49 to engage selectively the end 50 of the slide 51 so as to prevent movement thereof in adjusted degrees in a direction which would produce coming together of the outer ends of the members 39 and 57, thus maintaining their ends in adjusted separation while engaged with the motor block and the valve spring.

Reference to Figure 5 will disclose the method of employing the pawl 48 in association with the slide 51 to lock the members 39 and 57 in separated relationship to permit the operator to take his hands from the device and in order that he may devote all of his manual capacity to the work upon the valve mechanism.

The similarity between the above described structure and the corresponding structure of Figure 1 will now be seen. In Figure 1 the swingable element 57a is identical with that indicated at 57 in Figures 2 and 4 except that the member 57a does not have the bend 64. It will also be observed that the U-shaped formation of the bars 39 and the operating lever 58 correspond to that of the same parts designated 39a and 58a in Figure 1. The members 39a and 58a are confined on a portion of the frame 5 so that the device will not fall from the frame the frame being received between the bars of the members 39a and 58a.

The outward end of the bar 39a, has already been described as attached to the web 24a. The same end of the swingable member 57a is placed so as to engage in the groove 21, the flange 23 occupying the same relation as would a valve spring washer in the case of the form of the invention illustrated in the other figures of the drawings.

The spindle 18 is provided at its upper end with a point 29 for engaging in the depression in the head of a valve. Depending on the positioning of the valve and the type of motor block, the swingable element 37 or the stationary element 33 is used to contact the washer of the valve spring by being inserted thereunder and it will be obvious that by swinging the operated handle 58a of the valve lifter mechanism 30, vertical movement of the spindle assembly will take place toward the element 33 so as to compress the valve spring and permit the removal of the valve pin or other parts as desired.

It will also be observed that the screw-threaded adjustment of the spindle 18 which was referred to above provides for a very fine and close adjustment of the device. The general structure of the device and the features of adjustment provided therein permit the placing of the entire device with respect to the work so that the mechanic may remove his hands and employ them in removing and adjusting valve mechanisms even in the most difficult positions such as encountered in the V-type motor.

In utilizing the device of the invention illustrated in Figure 1, the element 33 or 37 being employed according to the type of motor structure is placed under the valve spring structure and the plate 27 either subsequently or simultaneously placed upon the top of the valve and centered thereon by means of the pointed end of the spindle which may be entered in a centralized depression provided in the top of some types of valves. In this position the frame of the device obviously reaches around the upper part of the motor block and the operating structure 30 is then above the top of the block, while the element 33 or 37 reaches down under the head portion of the block into the valve tappet chamber. When this disposition of the device has been made, the spindle may be rotated so as to secure the desired engagement of the device with the top of the valve and with the underside of the spring structure so that the device will not fall therefrom and so that undesirable play is eliminated. In this process the disk or flat plate 27 may be moved into close engagement with the top of the valve in the manner described by rotating the spindle by means of the hand wheel 19 or by rotating the plate 27 itself. In this disposition the member 30 is in the unexpanded condition. However, upon bringing the handle members 38a and 39a thereof together, the movable leg 37a will be moved away from the companion leg and cause the frame to move upwardly relative to the disk and spindle whereby the valve spring is compressed upwardly and may be held in this position by means in the member 30 already described.

It will now be seen that I have provided a very efficient, rugged, and desirable type of valve lifter structure, which facilitates the various operations conditioned upon compressing and holding in compressed condition the valve springs of internal combustion engines whereby labor and trouble is saved due to the more efficient mechanical operations made possible, and one man may do the work of several.

It is to be definitely understood that I do not desire to limit the application of this invention to the particular modifications set out herein to illustrate the principles thereof, and any change or changes may be made in material and structure and arrangement of parts consistent with the spirit and scope of the invention.

I claim:

1. A valve spring tool of the type described comprising a substantially U-shaped frame having its bight and legs capable of extension for bringing into required operative positions motor block and valve spring engaging portions of the tool in working upon different types of motors, a vertically slidable and screw-threadedly adjustable valve head engaging means on one leg of the frame, and a stationary and an auxiliary movable valve spring engaging means on the other leg of the frame, and manually operable means associated with the slidable valve head engaging means for vertically moving said valve head engaging means while said valve spring engaging means is engaged with a valve spring, whereby to adjustably compress the valve spring, and means on said manually operable means to lock the tool in valve spring compressing position.

2. A valve spring tool of the type described comprising a substantially U-shaped frame having its bight and legs capable of extension for bringing into required operative positions motor block and valve spring engaging portions of the tool in working upon different types of motors, a vertically slidable and screw-threadedly adjustable valve head engaging means on one leg of the frame, and a stationary and an auxiliary movable valve spring engaging means on the other leg of the frame, and manually operable means associated with the slidable valve head engaging means for vertically moving said valve head engaging means while said valve spring engaging means is engaged with a valve spring, whereby to adjustably compress the valve spring, and means on said manually operable means to adjustably lock the tool in valve spring compressing position, said manually operable means consisting of a stationary U-shaped bar transversely positioned on the frame, depending supports on said bar intermediate its ends, a swingable arm pivoted on said support and connected to the valve head engaging means, a slide movable on the stationary bar, an operating lever also pivoted on said supports, and links between the slide and the swingable arm, and links between the slide and the operating lever, whereby said swingable arm is or may be moved as a consequence of moving said operating lever.

3. A valve spring tool of the type described comprising a substantially U-shaped frame having its bight and legs capable of extension for bringing into required operative positions motor block and valve spring engaging portions of the tool in working upon different types of motors, a vertically slidable and screw-threadedly adjustable valve head engaging means on one leg of the frame, and a stationary and an auxiliary movable valve spring engaging means on the other leg of the frame, and manually operable means on said frame and associated with the slidable valve head engaging means for vertically moving said valve head engaging means while said valve spring engaging means is engaged with a valve spring, whereby to adjustably compress the valve spring, and means on said manually operable means to adjustably lock the tool in valve spring compressing position, said manually operable means consisting of a stationary U-shaped bar transversely positioned on the frame, depending supports on said bar intermediate the ends thereof, a swingable arm pivoted on said supports and connected to the valve head engaging means, a slide movable on the stationary bar, an operating lever also pivoted on said supports, and links between the slide and the swingable arm, and links between the slide and the operating lever, whereby said swingable arm is or may be moved as a consequence of moving said operating lever, and said means to adjustably lock the tool in valve spring compressing position comprising a pawl mounted on one of said supports and adapted to be swung to selectively engage portions thereof with one end of the slide for detaining the slide against movement in one direction.

In testimony whereof I affix my signature.

JAMES P. McCREADY.